US009115800B2

(12) United States Patent
Boland et al.

(10) Patent No.: US 9,115,800 B2
(45) Date of Patent: Aug. 25, 2015

(54) PLANETARY CARRIER

(71) Applicant: Siemens Aktiengesellschaft, München (DE)

(72) Inventors: Thomas Boland, Bocholt (DE); Alexander Kamps, Rhede (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/961,342

(22) Filed: Aug. 7, 2013

(65) Prior Publication Data
US 2014/0045644 A1 Feb. 13, 2014

(30) Foreign Application Priority Data
Aug. 8, 2012 (DE) .......................... 10 2012 214 023

(51) Int. Cl.
F16H 57/08 (2006.01)
F16C 35/06 (2006.01)
(52) U.S. Cl.
CPC .............. F16H 57/082 (2013.01); F16C 35/06 (2013.01); F16H 57/08 (2013.01)
(58) Field of Classification Search
USPC .................................. 384/527, 559, 561, 626
See application file for complete search history.

(56) References Cited

U.S. PATENT DOCUMENTS

| 3,718,054 | A | * | 2/1973 | Perkins et al. | ................ | 475/266 |
| 3,757,605 | A | * | 9/1973 | Morden | ........................ | 475/266 |
| 3,890,020 | A | * | 6/1975 | Thomas | ........................ | 384/559 |
| 6,865,809 | B2 | * | 3/2005 | Vorbeck | ........................ | 29/893.1 |
| 7,182,709 | B2 | * | 2/2007 | Christ et al. | ................... | 475/348 |
| 8,371,759 | B2 | * | 2/2013 | Fukuda et al. | ................ | 384/512 |
| 2006/0033381 | A1 | * | 2/2006 | Suma | ......................... | 301/105.1 |
| 2010/0222173 | A1 | | 9/2010 | Diosi et al. | | |

FOREIGN PATENT DOCUMENTS

| DE | 102005031066 A1 | 2/2007 |
| EP | 0709590 A1 | 5/1996 |
| GB | 274039 A | 9/1927 |
| JP | 2012219680 A * | 11/2012 |
| WO | WO 2009083657 A1 | 7/2009 |
| WO | WO 2011077869 A1 | 6/2011 |

OTHER PUBLICATIONS

Human translation of EP 0709590 A1 ("Seiwert").*

* cited by examiner

Primary Examiner — Robert Hodge
Assistant Examiner — Alberto Interian, III
(74) Attorney, Agent, or Firm — Henry M. Feiereisen LLC

(57) ABSTRACT

A planetary carrier includes a side plate having a front face and a shaft journal which is arranged on the front face of the side plate. A bearing seating is formed on an outer circumferential surface of the shaft journal on a front-face-proximal end of the shaft journal. The planetary carrier has an annular groove directly adjacent to the bearing seating in coaxial relationship to the shaft journal and undercutting the front face and the outer circumferential surface.

5 Claims, 3 Drawing Sheets

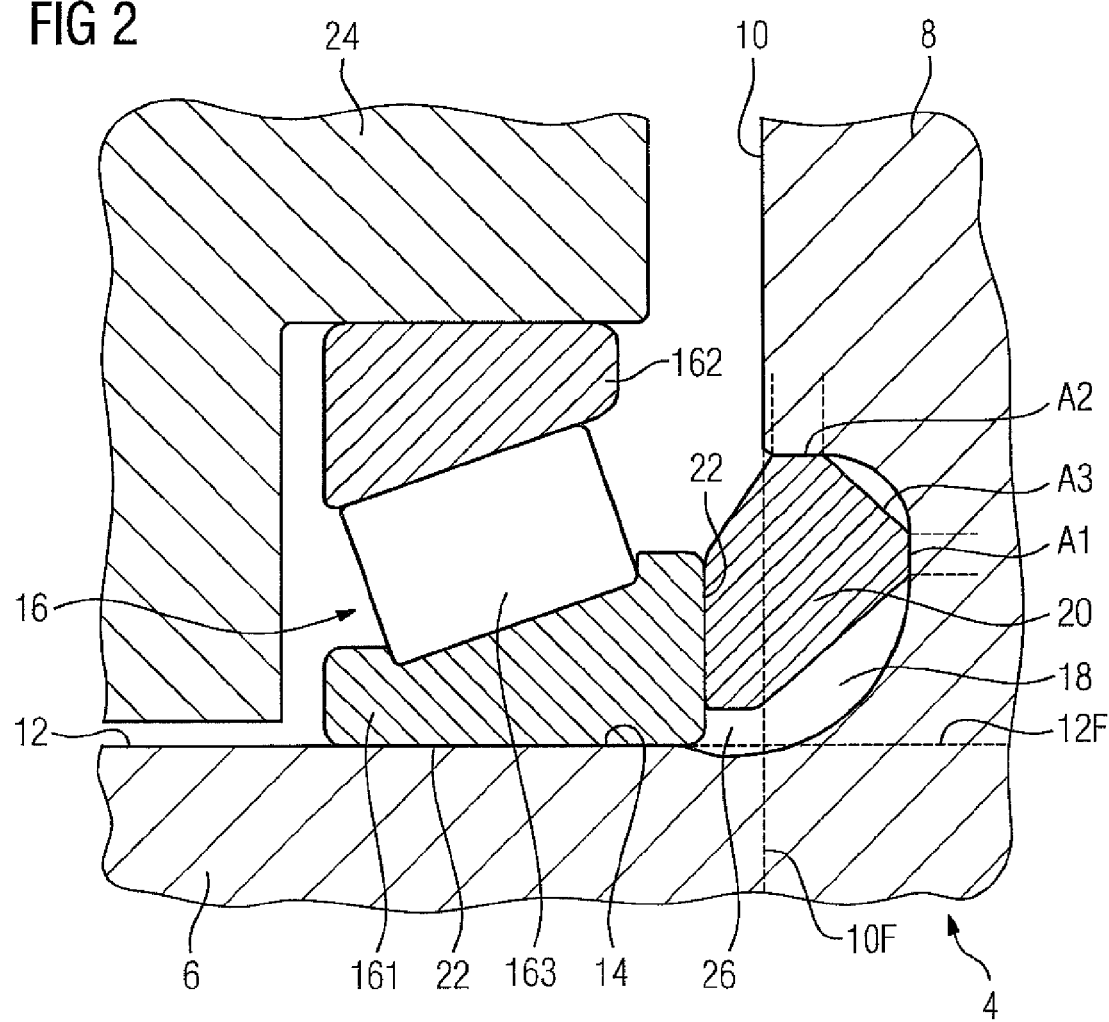

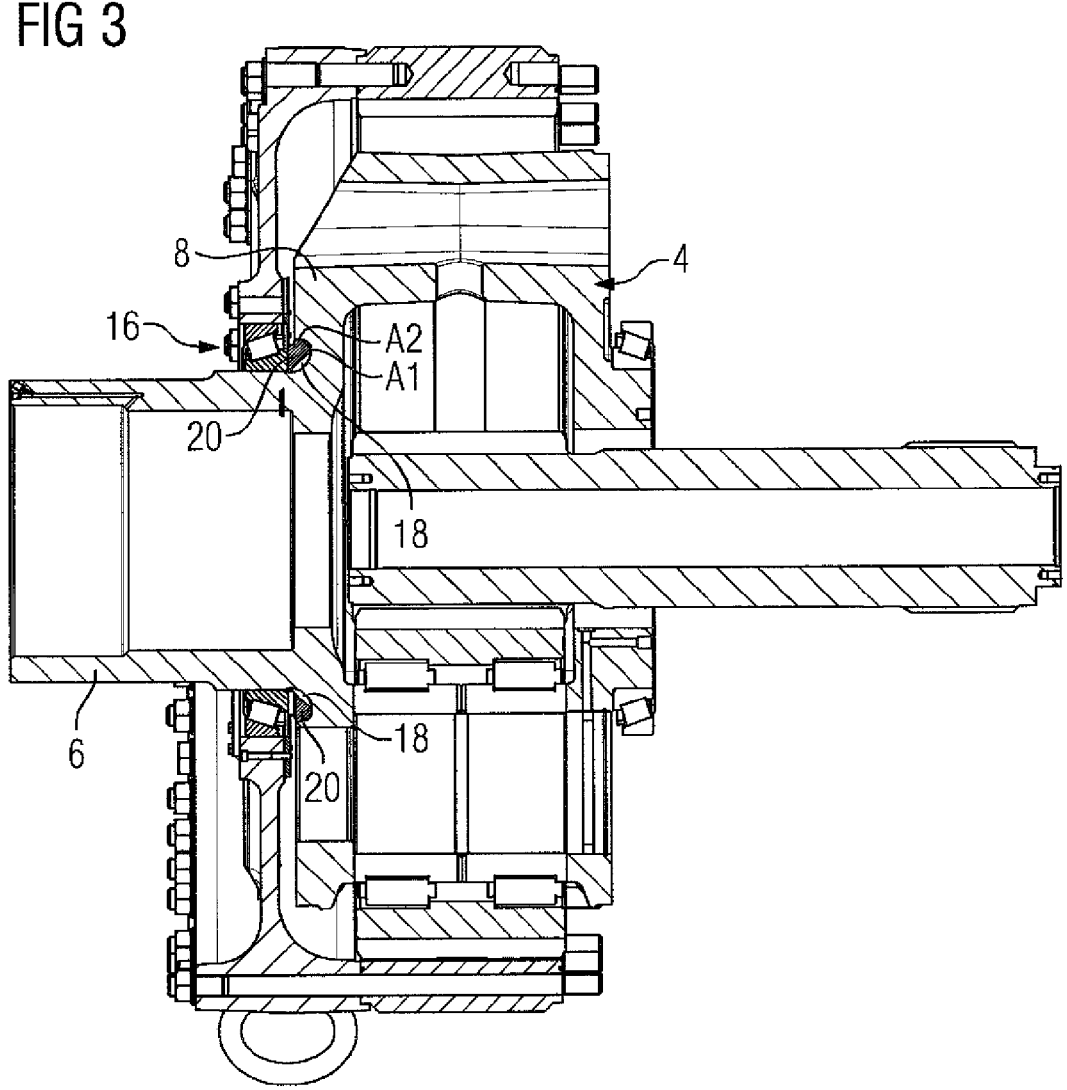

PLANETARY CARRIER

CROSS-REFERENCES TO RELATED APPLICATIONS

This application claims the priority of German Patent Application, Serial No. 10 2012 214 023.9, filed Aug. 8, 2012, pursuant to 35 U.S.C. 119(a)-(d), the content of which is incorporated herein by reference in its entirety as if fully set forth herein.

BACKGROUND OF THE INVENTION

The present invention relates to a planetary carrier and a planetary gearbox.

It would be desirable and advantageous to provide an improved planetary carrier and an improved planetary gearbox to obviate prior art shortcomings.

SUMMARY OF THE INVENTION

According to one aspect of the present invention, a planetary carrier includes a side plate having a front face, a shaft journal arranged on the front face of the side plate, and a bearing seating formed on an outer circumferential surface of the shaft journal on a front-face-proximal end of the shaft journal, the planetary carrier having an annular groove directly adjacent to the bearing seating in coaxial relationship to the shaft journal and undercutting the front face and the outer circumferential surface.

According to another aspect of the present invention, a planetary gearbox includes a planetary carrier having a side plate with a front face, a shaft journal arranged on the front face of the side plate, and a bearing seating formed on an outer circumferential surface of the shaft journal on a front-face-proximal end of the shaft journal; the planetary carrier having an annular groove directly adjacent to the bearing seating in coaxial relationship to the shaft journal and undercutting the front face and the outer circumferential surface, a planetary carrier bearing arranged in the bearing seating of the planetary carrier, and an outwardly centered spacer ring arranged in the groove axially between the planetary carrier bearing and the side plate.

The planetary carrier serves to carry planetary wheels, which engage in a planetary gearbox with a sun gear and an annulus. The planetary carrier comprises a side plate. Arranged on a front side of the side plate is a shaft journal. The shaft journal can be at least part of a drive shaft or output shaft. Depending on the application, the shaft journal can be hollow. The planetary carrier has at least one bearing seating for the mounting of a planetary carrier bearing, e.g. of a roller bearing. By means of the bearing, the planetary carrier can be mounted rotatably opposite a housing part of the planetary gearbox. The bearing seating is arranged on an outer circumferential surface of the shaft journal, i.e. an external lateral surface of the shaft journal.

At the transition from the essentially axially extending shaft journal of the planetary carrier to the essentially radially extending side plate of the planetary carrier, a notch effect brought about by the shaft shoulder is compensated for by appropriate dimensioning of the components. This is achieved by the presence of the annular groove, running coaxially with the shaft journal and immediately connected to the bearing seating, which undercuts the front face and the outer circumferential surface. As a result of undercutting the lateral surface of the shaft journal and the front face of the side plate of the planetary carrier, the groove has a relatively large radius or a multiplicity of radii in rows. In this way the notch effect can be significantly reduced.

Advantageously, the planetary carrier has a bearing seating in each of both outer front sides of its side plates to accommodate a bearing. Thus, a groove according to the invention can be formed on both sides of the planetary carrier.

Axial positioning of a planetary carrier bearing arranged in the bearing seating can be effected via a spacer ring, which is arranged axially between the planetary carrier bearing and the side plate of the planetary carrier.

According to the invention, the spacer ring is outwardly centered. Until now the spacer ring has been inwardly centered, i.e. radially routed on the lateral surface of the planetary carrier, which also embodies the bearing seating for accommodating the planetary carrier bearing. The radius for reduction of the notch effect is here axially limited to the width (=axial extension) of the spacer ring, minus the length necessary for routing of the spacer ring. By contrast, according to the present invention, the spacer ring is not routed on the described lateral surface of the planetary carrier, but on an offset additionally created radially further out by means of the groove. In this way the radius for reduction of the notch effect can extend over the entire width of the spacer ring plus the width of a radius of curvature which can be positioned radially beneath the inner bearing ring. Compared with the previous solutions, the outward centering of the spacer ring thus enables a significantly wider radius for reduction of the notch effect, with a construction space for the planetary gearbox which is the same size as or even smaller than in the case of the previous solutions.

Because of the fact that instead of inward centering of the spacer ring, i.e. routing of the spacer ring on the lateral surface of the shaft journal, an outward centering of the spacer ring, i.e. routing of the spacer ring on the groove surfaces located in the side plate takes place, and the spacer ring with its radially internal end is thus separated from the lateral surface of the shaft journal, i.e. quasi "hangs in the air", the advantageous possibility arises of making use of the untouched area immediately adjacent to the inner bearing ring for the planetary carrier radius necessary for reduction of the notch effect.

Heretofore, the spacer ring has been centered on the shaft journal. In contrast thereto, the spacer ring according to the present invention is not centered on the shaft journal, but in the undercut of the planetary carrier. Only in this way is it possible to undercut the shaft journal radially, viewed axially in the area of the spacer ring, and in part also in the area of the bearing, in order to achieve an improved power flux.

According to another advantageous feature of the present invention, the groove can have a cross-section having two non-curved sections in a sectional plane containing an axis of rotation of the planetary carrier, with the two non-curved sections being separated from each other by a curved section. The non-curved sections can serve as supporting surfaces for the spacer ring, which is routed via these. The two non-curved sections enable a spacer ring to be inserted in the groove and reliably routed in an outwardly centered manner, which enables an advantageous embodiment of the radius necessary for reduction of the notch effect.

According to another advantageous feature of the present invention, the two non-curved sections can have an angle of 90 relative to each other. As a result of the right-angled offset, the two surfaces which can be employed as support surfaces can be simply manufactured, more easily than in the case of a displacement at an angle other than 90.

According to another advantageous feature of the present invention, one of the two non-curved sections can run parallel to the front face, and the other one of the two non-curved sections can run parallel to the outer circumferential surface, but with opposite orientation. The reference to "with opposite orientation" means that in a cross-section of the groove in a sectional plane containing the axis of rotation of the planetary carrier, the outer circumferential surface runs parallel to the second non-curved section, but turned by 180. In this way, a definite and easy to manufacture angular position of the surfaces which can be used for support of the spacer ring relative to the shaft's lateral surface and the side plate front face of the planetary carrier can be established.

According to another advantageous feature of the present invention, the planetary carrier bearing can include an inner ring having a front side in proximal relationship to the side plate, with the front side of the inner ring abutting the spacer ring. The planetary carrier bearing can thus be held at a predefined distance from the side plate.

According to another advantageous feature of the present invention, the spacer ring can be configured to only abut the planetary carrier in an area of the two non-curved sections. Providing a bevel on the spacer ring between the two curved sections creates an airspace in this area.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a detailed sectional view of a planetary gearbox in an area of a groove of the planetary carrier; and FIG. 3 is a sectional view of the planetary gearbox.

DETAILED DESCRIPTION OF PREFERRED EMBODIMENTS

Figure 1:
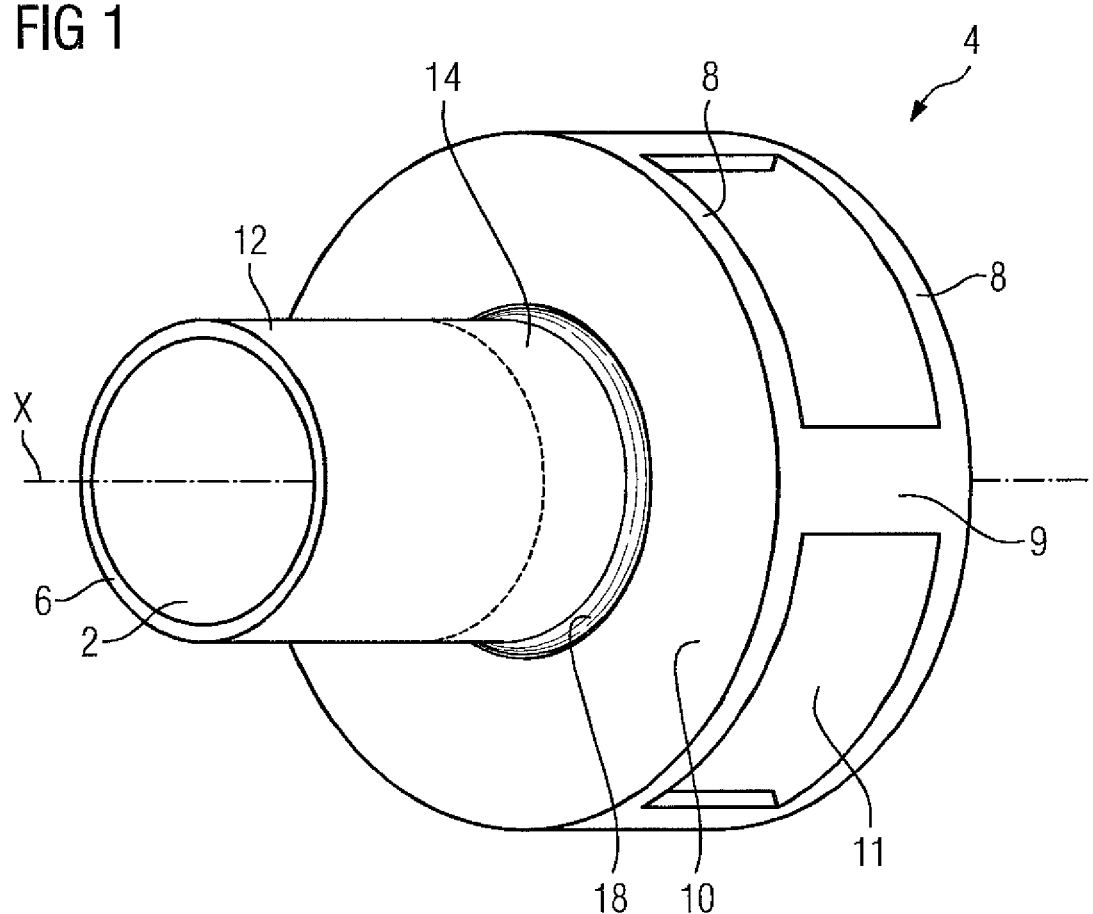
FIG. 1 is a perspective view of a planetary carrier according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a planetary carrier according to the present invention, generally designated by reference numeral 4, for a planetary gearbox, e.g. for a wind power plant. The planetary carrier 4 comprises two parallel side plates 8, which are connected to each other by means of webs 9. Between the webs 9 are recesses 11, in which planetary wheels can be inserted and mounted in a rotatable manner. A shaft journal 6 is arranged on a front face 10 of a side plate 8 facing away from the recesses 11. The shaft journal 6 is also designated as a planetary carrier shaft. The cylindrical shaft journal 6 has a cavity 2, in which for example a drive shaft or output shaft can be inserted. A rotor shaft of a wind power plant can for example be connected to the shaft journal 6. The shaft journal can be embodied in one piece with the side plate, e.g. cast as one unit, or connected to the side plate using jointing methods such as welding.

At the transition between the shaft journal 6 and the side plate 8, that is along the ring, at which the outer circumferential surface 12 of the shaft journal 6 blends into the front face 10 of the side plate 8, a groove 18 is formed coaxially with the axis X of the shaft journal 6. The groove 18 forms a connecting surface between the outer lateral surface 12 of the shaft journal 6 and the front face 10 of the side plate 8. The groove 18 undercuts both the outer lateral surface 12 of the shaft journal 6 and also the front face 10 of the side plate 8. On the end of the shaft journal 6 facing the front face 10, on the outer circumferential surface 12, i.e. the outer lateral surface, of the shaft journal 6 is embodied a bearing seating 14, which is suitable for arrangement of a planetary carrier bearing.

The groove 18 undercuts the outer lateral surface 12 of the shaft journal 6 by extending into the shaft journal inwardly beyond its outer lateral surface 12, and undercuts the front surface 10 of the side plate 8 by extending into the side plate beyond its front surface 10.

FIG. 2 shows a section through a planetary gearbox in the area of the groove 18 of an inventive planetary carrier 4. In addition to a sun gear, the planetary carrier 4 with the planetary wheels mounted therein and an annulus, the planetary gearbox comprises a planetary carrier bearing 16. The planetary carrier 4 is rotatably mounted against a housing part 24 by means of the planetary carrier bearing 16, which in the exemplary embodiment represented in FIG. 2 is embodied as a roller bearing, in particular as a taper roller bearing. The planetary carrier bearing 16 arranged in a bearing seating 14 of the shaft journal 6 has an inner bearing ring 161, an outer bearing ring 162 and rollers 163 inserted between these two rings 161, 162.

Embodied in a transitional area between the shaft journal 6 and the side plate 8 is a groove 18, which undercuts the outer circumferential surface 12 of the shaft journal 6 or as the case may be its notional continuation 12F. In addition, the groove 18 undercuts the front face 10 of the side plate 8 or its notional continuation 10F. In the section of groove 18 two non-curved sections A1, A2 can be discerned, which are separated by a curved section A3. One non-curved section A1 is parallel to the front face 10 of the side plate 8. The other non-curved section A2 is parallel to the outer circumferential surface 12 of the shaft journal 6, but is oriented in the opposite direction. The other sections of the groove 18 are curved in concave form.

Set into the groove 18 is a spacer ring 20, which abuts a front face 22 of the inner bearing ring 161 facing the side plate 8 and the two non-curved sections A1, A2 of the groove 18. The planetary carrier bearing 16 is separated from the side plate 8 by the spacer ring 20. As a result of the outward centering of the spacer ring 20 with the aid of the sections A1, A2 an airspace 26 exists between the radially innermost part of the spacer ring 20 and the area of the groove 18 located radially therein.

FIG. 3 shows a section through a wind power plant shaft-mounted gear unit, comprising a single-stage planetary gearbox as a slow, first stage and a two-stage spur gear unit downstream of the planetary gearbox. Formed in the side plate 8 of the planetary carrier 4 located towards the slip-on hollow shaft journal 6 and in the area of the shaft journal 6 immediately connected to the side plate is a groove 18, which undercuts the front side of the side plate 8 and the outer circumferential surface of the shaft journal 6. Inserted therein is an outwardly centered spacer ring 20, which abuts an inner ring of a planetary carrier bearing 16. In addition, the spacer ring abuts two sections of the side plate, specifically a section A1 furthest removed axially from the shaft journal 6 and a section A2 of the groove 18 furthest removed radially from the shaft journal 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A planetary gearbox, comprising:
    a planetary carrier including a side plate having a front face, a shaft journal arranged on the front face of the side plate, and a bearing seating formed on an outer circumferential surface of the shaft journal on a front-face-proximal end of the shaft journal, said planetary carrier having an annular groove directly adjacent to the bearing seating in coaxial relationship to the shaft journal and undercutting the front face and the outer circumferential surface;
    a planetary carrier bearing arranged in the bearing seating of the planetary carrier; and
    an outwardly centered spacer ring arranged in the groove axially between the planetary carrier bearing and the side plate,
    wherein the groove has inside the side plate a cross-section having two non-curved sections in a sectional plane containing an axis of rotation of the planetary carrier, said two non-curved sections being separated from each other by a curved section inside the side plate,
    wherein the two non-curved sections inside the side plate extend at an angle of 90 degrees in relation to each other, and
    wherein the spacer ring is configured to abut the planetary carrier in an area of the two non-curved sections.

2. The planetary gearbox of claim 1, wherein the planetary carrier bearing includes an inner ring having a front side in proximal relationship to the side plate, said front side of the inner ring abutting the spacer ring.

3. The planetary gearbox of claim 1, wherein one of the two non-curved sections runs parallel to the front face, and the other one of the two non-curved sections runs parallel to the outer circumferential surface in an opposite direction.

4. The planetary gearbox of claim 1, wherein the annular groove is sized to extend into the side plate inwardly beyond the front face of the side plate and to extend into the shaft journal inwardly beyond the outer circumferential surface of the shaft journal.

5. The planetary gearbox of claim 1, wherein the spacer ring only abuts the side plate of the planetary carrier inside the area of the two non-curved sections inside the side plate.

* * * * *